United States Patent [19]

Hall

[11] Patent Number: 5,395,708

[45] Date of Patent: Mar. 7, 1995

[54] BIMODAL ELECTRIC VEHICLE BATTERY SYSTEM

[75] Inventor: John C. Hall, Saratoga, Calif.

[73] Assignee: Space Systems/Loral, Inc., Palo Alto, Calif.

[21] Appl. No.: 181,986

[22] Filed: Jan. 14, 1994

[51] Int. Cl.⁶ .......................................... H01M 10/50
[52] U.S. Cl. .................................. 429/120; 429/101; 320/35
[58] Field of Search ................... 429/120, 26, 101, 61, 429/62; 320/2, 35

[56] References Cited

U.S. PATENT DOCUMENTS

| | | |
|---|---|---|
| 3,928,792 | 12/1975 | Mullersman et al. |
| 4,098,962 | 7/1978 | Dennison. |
| 4,229,687 | 10/1980 | Newman. |
| 4,324,845 | 4/1982 | Stockel. |
| 4,680,241 | 7/1987 | Dyer. |
| 4,865,929 | 9/1989 | Eck. |
| 5,015,545 | 5/1991 | Brooks. |
| 5,071,652 | 12/1991 | Jones et al. |
| 5,141,826 | 8/1992 | Bohm et al. |
| 5,204,609 | 4/1993 | Alisauski. |
| 5,215,834 | 6/1993 | Reher et al. ............................ 429/62 |
| 5,229,702 | 7/1993 | Boehling et al. |

Primary Examiner—Anthony Skapars
Attorney, Agent, or Firm—Perman & Green

[57] ABSTRACT

The capacity of a nickel hydroxide based battery is increased when recharge is carried out at a much lower temperature than its discharge. In the instance of a vehicle including a load powered by a nickel oxide-hydrogen battery, a generator is provided for recharging the battery. A switch is selectively movable between a first position electrically coupling the battery to the load for operating the load and a second position electrically coupling the battery to the generator for recharging. Temperature control apparatus maintains the temperature of the battery at a first temperature in the range of approximately 10° C. to 50° C. when the battery is electrically coupled to the load and is operable for maintaining the battery at a second temperature substantially lower than the first temperature and in the range of approximately 10° C. to −30° C. when the battery is electrically coupled to the generator. When the battery is used to propel the vehicle, the temperature control apparatus may include a stationary heat exchanger external to the vehicle to which the battery can be coupled for cooling and an external source of EMF may also be provided to which the battery can be coupled for recharging.

9 Claims, 6 Drawing Sheets

BIMODAL ELECTRIC VEHICLE BATTERY SYSTEM

BACKGROUND OF THE INVENTION

I. Field of the Invention

The present invention relates generally to a battery system for use by a vehicle utilizing a nickel hydroxide based battery (e.g. nickel-hydrogen, nickel metal-hydride, nickel-iron, nickel-zinc, nickel-cadmium), and more particularly, to such a system in which, for example, the nickel hydroxide battery is recharged at a temperature which is substantially lower than the temperature at which discharge is performed.

II. Description of the Prior Art

It is well recognized that optimum performance for nickel hydrogen spacecraft batteries requires that their temperature be controlled in the range of $+20°$ C. to $-10°$ C. Higher temperatures lead to lowered capacity due to the early on-set of the parasitic electrolysis reaction, e.g., $$H_2O + 2e^- = OH^- + \tfrac{1}{2}O_2 \tag{1}$$

Reaction (1) has been recognized in the prior art to reduce capacity as the operating temperature of the battery is increased. A key to the present invention has been the recognition that the critical temperature is that at which the battery is recharged and reaction (1) competes with the normal recharge reaction, e.g., $$Ni(OH)_2 + OH^- = NiOOH + H_2O + e^- \tag{2}$$

Lower temperatures on the other hand have been found to lead to batteries which fail to operate. The reasons for this failure, prior to the present invention, were unclear as the freezing point of the electrolyte ($-61°$ C.) is well below the minimum operation temperature. The second key to the present invention has been the recognition that the lower temperature limit is due to a limitation in the ability of the battery to sustain high rate discharge required in satellites situated in a geosynchronous orbit (e.g., $\sim C/1.5$) as opposed to the lower rate recharge (e.g., $\sim C/10$).

Typical of the prior art as it relates to charging and discharging nickel batteries is U.S. Pat. No. 4,680,241 to Dyer. The Dyer patent concerns a method for partially or fully restoring the lost capacities of nickel batteries. In this instance, a nickel battery is cycled at least 10 times, with each cycle including a discharging step during which the capacity achieved at the end of the previous cycle is reduced by at least 5 percent, and a charging step. The charging rate employed during the charging step is greater than about C/10 per hour. Moreover, while the ratio of the amount of charge delivered to the battery during the charging step of each cycle to the amount of charge withdrawn from the battery during the previous cycle is greater than one, this ratio is chosen so that the temperature of the electrolyte of the battery does not exceed about 30° C.

It is clear, however, that the Dyer patent does not address the particular problem which the present invention is intended to solve.

Also known are rechargeable batteries with various forms of temperature control. For example, U.S. Pat. No. 5,229,702 to Boehling et al. describes protection of a rechargeable battery in a power system by placing it in an insulated chamber under temperature control of thermoelectric devices operated by the power system to pump heat out of the chamber or by the battery to pump heat into the chamber. U.S. Pat. No. 5,141,826 to Bohm et al. describes a high-energy battery with a plurality of individual cells in a housing through which a coolant flows, the coolant being guided such that it thermally affects only one or both end faces of the cells. U.S. Pat. No. 4,324,845 to Stockel describes a heat pipe which, using a working fluid such as Freon 21, connects a rechargeable cell to a radiator.

Various constructions of cooling apparatus are also known in the literature. For example, U.S. Pat. No. 5,071,652 to Jones et al. describe a plurality of adjacent cell modules separated by heat transfer members in the form of fins. U.S. Pat. No. 5,015,545 to Brooks describes a battery housing with air gaps to assure substantially uniform cooling of all cells. U.S. Pat. No. 4,865,929 to Eck describes a distributor panel with suitable openings to guide flow of coolant around battery cells to achieve optimum cooling.

As described in copending and commonly assigned U.S. application Ser. No. 08/182,224, filed Jan. 14, 1994, entitled "Satellite Battery Thermal/Capacity Design", the disclosure of which is hereby incorporated in its entirety, by reference, the capacity of a nickel hydroxide based battery system is increased when its recharge is carried out at a much lower temperature than its discharge. For satellite applications this is reduced to practice by suitably sizing the space radiator area and resetting the lower heater set point between charge and eclipse discharge.

The intrinsic capability of a space battery to be cold charged does not exist for other battery applications, however. Electric vehicles represent an application where cold charge could be of particular utility as gravimetric energy density and low cost are both critical. However, thermal management of these batteries has usually focused on the need to cool the battery during discharge while being driven. Such cooling typically exchanges heat between the vehicle and moving air. Thus the temperature of the battery based on this heat exchange approach can be no lower than the surrounding air. As vehicle recharge is envisioned as taking place inside the owner's garage, there is no equivalent heat sink to the spacecraft battery for carrying out cold charge.

It was in light of the state of the technology as just described that the present invention has been conceived and is now reduced to practice.

SUMMARY OF THE INVENTION

The present invention takes into account the fact that the capacity of a nickel hydroxide based battery is increased when recharge is carried out at a much lower temperature than its discharge. In the instance of a vehicle including a load powered by a nickel hydroxide based battery, a generator is provided for recharging the battery. A switch is selectively movable between a first position electrically coupling the battery to the load for operating the load and a second position electrically coupling the battery to the generator for recharging. On board temperature control apparatus maintains the temperature of the battery at a first temperature in the range of approximately 10° C. to 50° C. when the battery is electrically coupled to the load. A second temperature control system (part of the recharging system) is operable for maintaining the battery at a second temperature substantially lower than the first temperature and in the range during the last 25% of recharge of approximately −10° C. to −30° C. when the battery is electrically coupled to the generator. When the battery is used to propel the vehicle, the temperature control apparatus may include a stationary heat exchanger external to the vehicle to which the battery can be coupled for cooling and an external source of EMF may also be provided to which the battery can be coupled for recharging.

Electric vehicle recharge is envisioned as occurring at night (off peak electric utility load) in the operator's garage. The battery recharge power supply is based in the garage rather than on the vehicle to minimize rolling weight. In such a scenario, cold charging is possible if two requirements are met. First, the battery must be provided with two heat exchanger systems. The first system is used to control battery temperature during discharge. The second is used to control battery temperature during recharge. The two systems may have common components; however, they reject heat to different low temperature sinks. Secondly, in this scenario, the charging system for the vehicle, in addition to containing a dc power supply must also contain a refrigeration system. When connected to the vehicle, it both recharges the battery and cools it. This may be accomplished for example by pumping chilled brine through coolant tubes built into the battery. In this case, the only impact on the battery would be the added weight of the coolant tubes.

Figure 1:
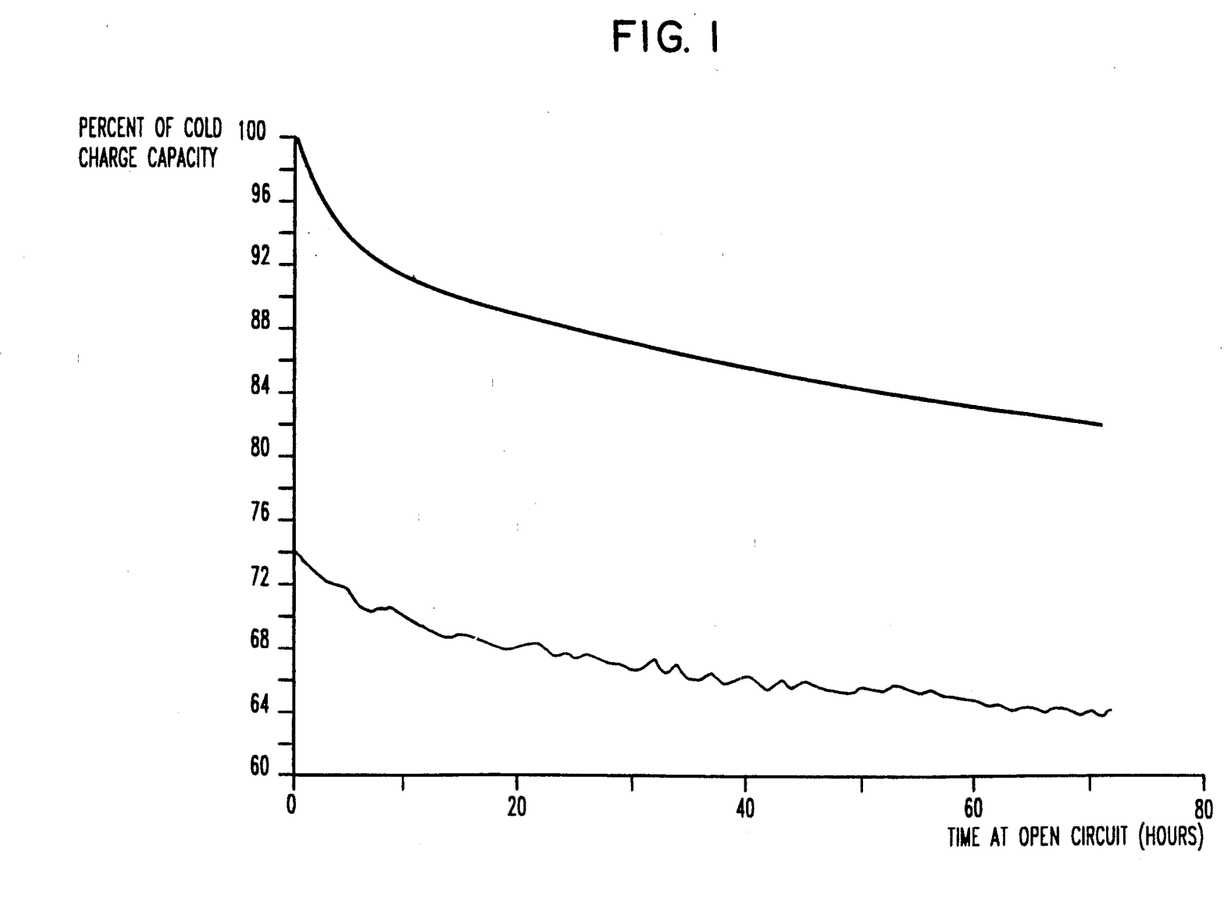
FIG. 1 is a graph depicting the enhanced charge retention of a battery operated according to the invention as compared with a conventionally operated battery.

The above approach is fundamentally different for that described in the space battery invention of application Ser. No. 08/182,224 mentioned above. The low temperature environment is now artificially created rather than intrinsically present. A second thermal control system is built into the battery. Nonetheless it is based on the same physical chemistry and the finding that the capacity introduced into the battery by low temperature recharge is retained when the battery is heated to a higher temperature either at open circuit or during discharge. FIG. 1 demonstrates this mode of operation. In FIG. 1, the lower curve depicts a normal, or prior art, +10° C. recharge followed by a +10° C. open circuit stand; the upper cursor depicts cold charge technology according to the invention: −20° C. recharge followed by +20° C. open circuit stand.

Figure 2:
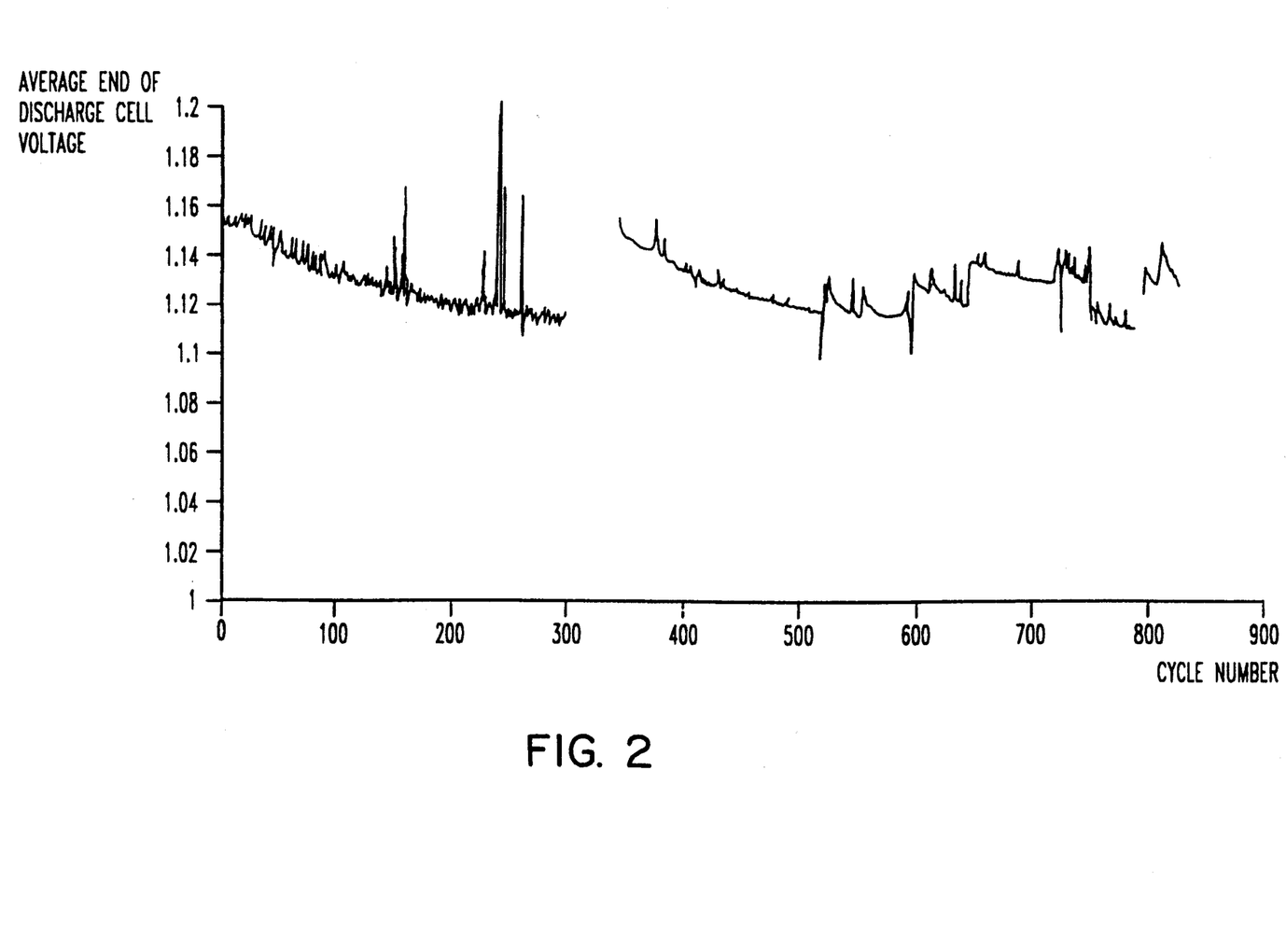
FIG. 2 is a graph which demonstrates capacity retention of cold charge technology versus conventional operation.

The key advantages of this invention are: (a) the weight of the recharge cooling system does not impact the weight of the vehicle; (b) the power required to operate the cooling system, like the power to recharge the battery, is low cost off-peak; (c) the capacity of the battery is enhanced by up to 50% without the addition of expensive and heavy nickel hydroxide electrodes; and (d) the low temperature recharge should enhance electrode life. FIG. 2 demonstrates this fact. In FIG. 2, the left hand curve depicts an average slope of a conventionally operated battery: 0.26 mV/cycle; the right hand curve depicts an average slope of a battery operated according to the invention: 0.1 mV/cycle.

Accordingly, a primary object of the invention is the provision of a unique method for increasing the capacity of a nickel hydroxide based battery when powering a vehicle.

Another object of the invention is to provide a method of increasing the capacity of a nickel hydroxide based battery powering a vehicle by charging at a temperature, or within a range of temperatures, which is lower than the temperature at which discharge begins.

A further object of the invention is to provide a vehicle powered by a nickel hydroxide based battery equipped with temperature control apparatus which may include a stationary heat exchanger external to the vehicle to which the battery can be coupled for cooling and an external source of EMF to which the battery can be coupled for recharging.

Other and further features, advantages, and benefits of the invention will become apparent in the following description taken in conjunction with the following drawings. It is to be understood that the foregoing generally description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENT

Figure 3:
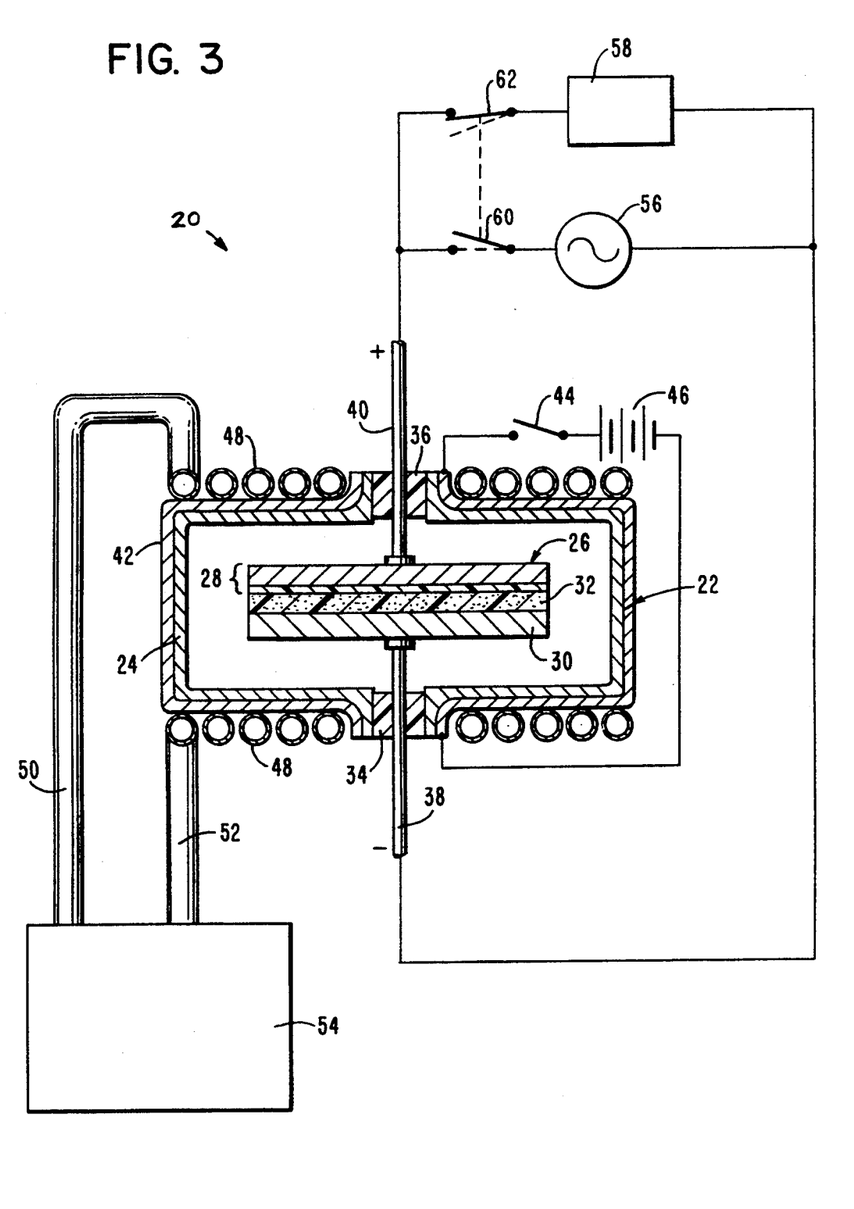
FIG. 3 is a diagrammatic representation of a battery system embodying the present invention and including a cross section view of a cell of a nickel hydroxide based battery used with the system.

As shown in FIG. 3, a nickel-hydrogen battery system 20 of the type with which the invention is concerned includes a cell 22 provided with a pressure vessel 24 and an electrode stack 26 within the pressure vessel. The electrode stack 26, in turn, includes a positive electrode 28, a negative electrode 30, and a porous separator 32 which also serves as an electrolyte reservoir for storing excess electrolyte within the electrode stack 26. The porous separator 32 may be composed of woven $ZrO_2$ ceramic cloth, felted asbestos, porous plastic, and the like. The positive electrode 28 includes electrochemically active nickel hydroxide and electrically conductive material having a resistivity less than approximately 0.1 ohm/cm. The negative electrode 30 is of a material which catalyzes the oxidation and reduction of hydrogen gas and, in typical fashion, the electrolyte is a 31% solution of potassium hydroxide (KOH).

The cell 22 also has electrical lead throughs 34, 36 through which negative and positive electrical leads 38, 40 respectively pass.

A suitable electrically energized heater jacket 42 overlies the pressure vessel 24. By closure of a switch 44, heating elements within the heater jacket 42 can be energized by a suitable source 46 of EMF for heating the cell 22.

In a reverse fashion, coolant fluid tubes 48 may encompass the cell 22. Conduits 50, 52 serve to connect the tubes 48 to suitable cooling apparatus 54.

A generator 56 is indicated for recharging the cell 22 and a typical load 58 is indicated for the discharge cycle of the cell. Ganged switches 60, 62 are operable for completing the circuit, in one instance, between the cell 22 and the generator 56, and, in another instance, between the cell 22 and the load 58.

Figure 4:
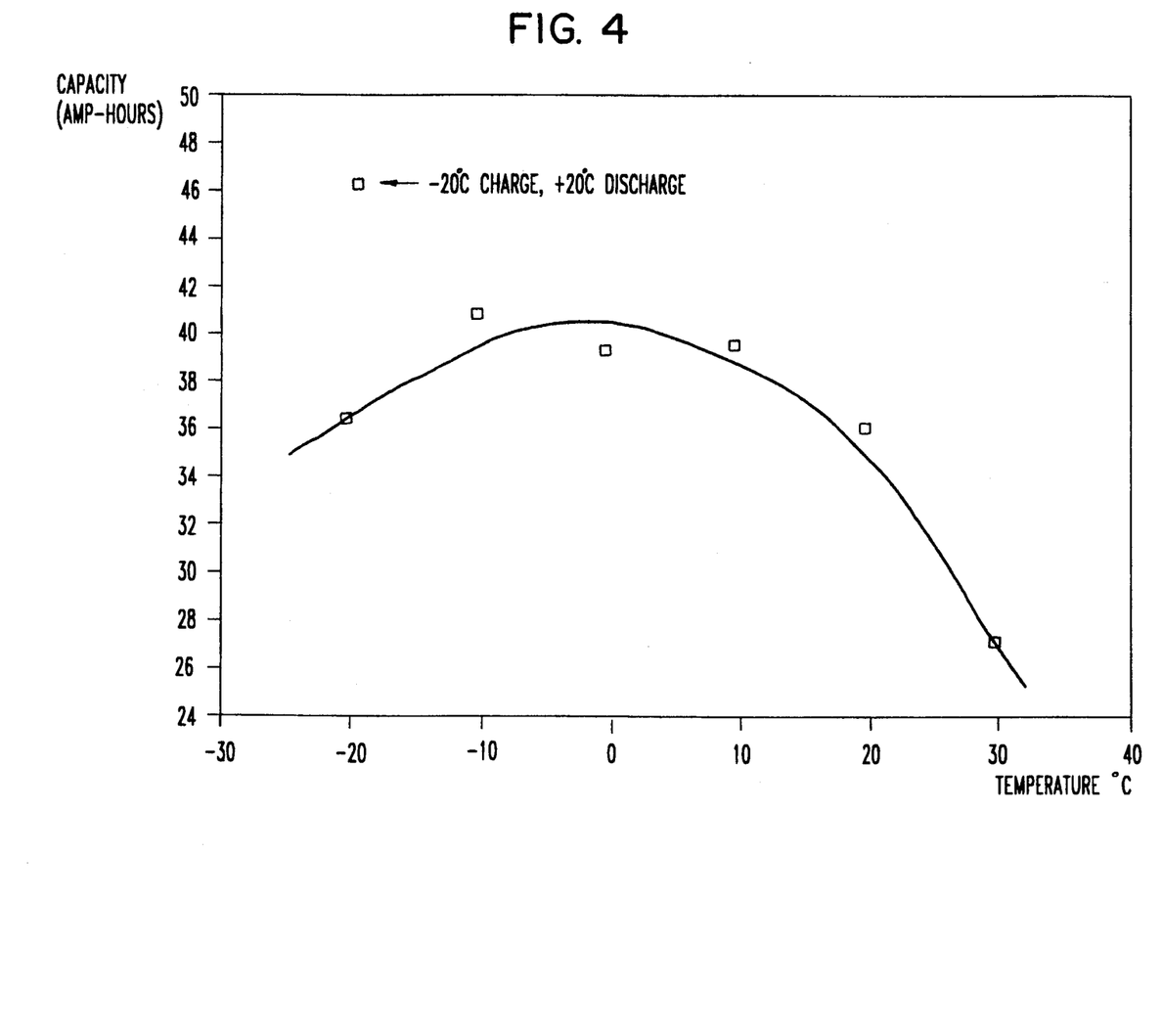
FIG. 4 is a graph presenting nickel-hydrogen cell capacity versus isothermal charge and discharge temperature.

In FIG. 4, a plot is provided of nickel-hydrogen cell capacity versus the isothermal charge and discharge temperature. As can be seen in FIG. 2, the delivered cell capacity peaks at a temperature between 0° C. and +10° C. Also provided in the figure is a datum in which the cell is charged at −20° C. and discharged at +20° C. As can be seen, this bimodal temperature operation leads to the highest cell capacity. The interpretation of this result is that the kinetics of cell discharge are improved at high temperature whereas the kinetics of cell charging are more optimum at lower temperature.

In a second test, a cell was (a) charged and discharged at −20° C., (b) charged at −20° C., allowed to stand at open circuit for 4 hours and then discharged at −20° C. and (c) charged at −20° C. warmed to +10° C. and discharged. Case (c) operated in a fashion comparable to case (a). The interpretation of these results is as follows:

(i) in case (a), the internal heating of the cell was sufficient to raise its temperature to a point at which it was operable at an abnormally low temperature;

(ii) in case (b), the open circuit period led to a decrease in the cell internal temperature to a point at which the cell could no longer support a high rate of operation; and (iii) in case (c), the cold recharge capacity which could not be extracted in case (b) was available once the temperature was increased to a point at which the battery was operable.

Figure 5:
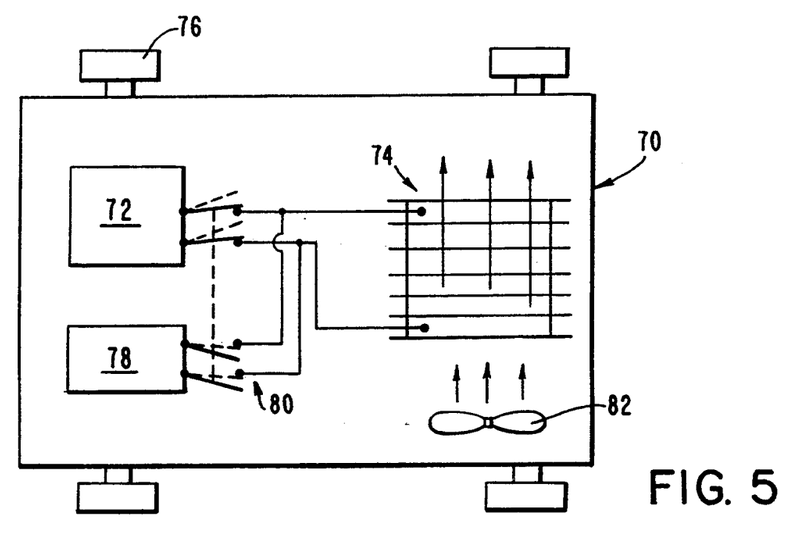
FIG. 5 is a diagrammatic view illustrating a first embodiment of a vehicle utilizing the invention.
Figure 6:
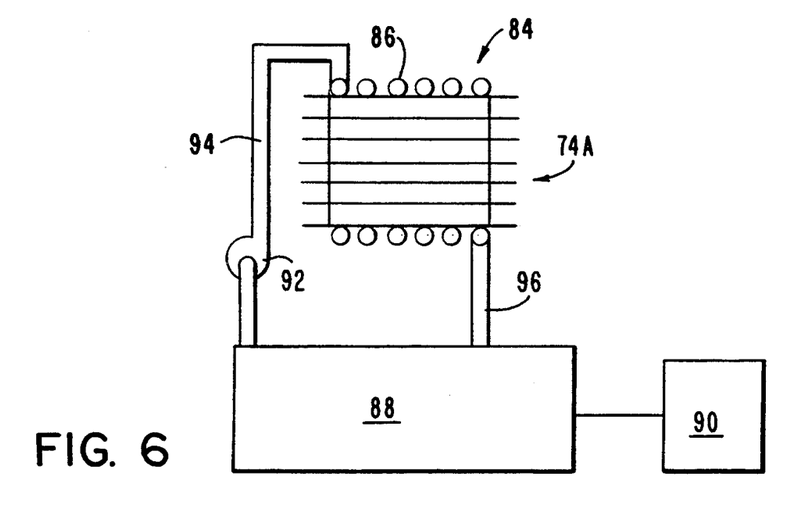
FIG. 6 is a diagrammatic representation of a modified temperature control system for use with the vehicle depicted in FIG. 5.
Figure 7:
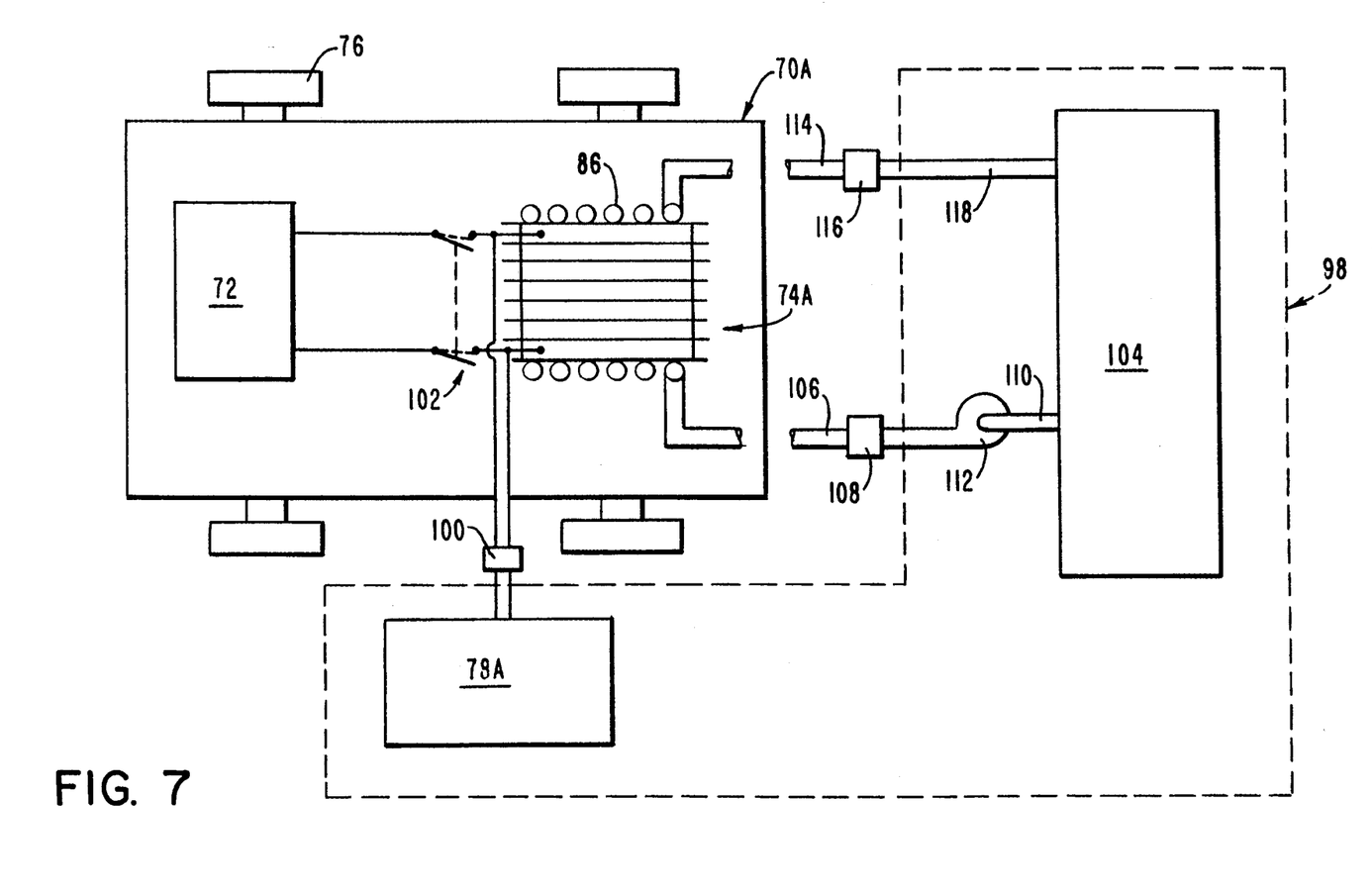
FIG. 7 is a diagrammatic view of a preferred system for recharging the battery of a modified vehicle utilizing the invention.

Turn now to FIGS. 5, 6 and 7 for a description of an earth-based vehicle which utilizes the technology just described.

In FIG. 5, a vehicle 70 is diagrammatically depicted as including a load 72 powered by a nickel hydroxide based battery 74. The load 72 may include accessories for the vehicle or it may include a drive train including wheels 76 for propelling the vehicle. Separate from the vehicle is a stationary recharging system 78 (e.g. a generator) and a recharging cooling system 82 diagrammatically represented by a fan. Ganged switching apparatus 80 is selectively movable between a first position as indicated by solid lines electrically coupling the battery 74 to the load 72 for operation of the load. Alternatively, the switching apparatus 80 can be moved to a second, dashed line, position so as to electrically couple the battery 74 to the recharging system for recharging the battery. The temperature control system 82 is indicated for causing flow of ambient air across the body of the battery 74 for cooling purposes during discharge. In keeping with the invention, the temperature of the ambient air being caused to flow across the body of the battery by the fan 82 would be substantially higher than the temperature of the battery when the battery is electrically coupled to the generator 78. During recharge the battery is cooled substantially below its nominal discharge temperature (+10° C. to +50° C.) to a temperature between +10° C. and −30° C. by the recharging cooling system.

A more detailed recharging cooling system is diagrammatically illustrated at 84 in FIG. 6. In this instance, a modified nickel hydroxide based battery 74A is provided which incorporates integrated cooling coils 86. These coils are coupled to the recharging cooling system. This system comprises of an externally powered refrigerator 88, a heat exchanger fluid such as brine which is cooled by the refrigerator and a pump 92 for moving the heat exchanger fluid through the cooling tube of the battery.

An alternate reduction to practice of the invention would be for the recharge refrigerator 88 to cool air to −10° C. to −30° C. The cooled air could then be blown by the previously described on board fan 82 over the battery to cool it.

Turn now to a preferred embodiment of the invention as illustrated in FIG. 7. In this instance, a combined cooling and generating system 98 is provided externally of a vehicle 70A powered by a nickel hydroxide based battery 74A. The vehicle 70A is similar to that illustrated in FIG. 6. Thus, for example, the system 98 may be provided in the garage in which the vehicle 70A is housed when not in operation.

The external system 98 includes a generator 78A which can be electrically connected to the battery 74A for recharging purposes via a connect-disconnect receptacle 100. When the battery 74A is being charged by the generator 78A, switching apparatus 102 is operated to electrically disconnect the load 72 from the battery. When charging has been completed and the generator 78A has been disconnected from the battery by disconnecting the receptacle 100, the switching apparatus 102 can again be operated to connect the battery 74A to the load 72.

The system 98 also includes a suitable refrigerator and heat exchanger 104 which is operable to reduce the temperature of a coolant to a sufficient extent for introduction to the battery 74A. A first inlet pipe 106 is in fluid communication with the coils 86 and by means of a releasable joint 108 can be connected to a second inlet pipe 110 which communicates with the heat exchanger 104. A pump 112 is effective to deliver coolant from the heat exchanger 104 to the cooling coils 86. For the return of the coolant, a first outlet pipe 114 is in fluid communication with the cooling coils 86 and, via a releasable joint 116, connects to a second outlet pipe 118 which is in fluid communication with the heat exchanger 104 to complete the circuit.

By reason of this construction, the vehicle 70A requiring a recharge is connected to the system 98 which performs in the manner previously described whereby recharging occurs at a temperature level substantially reduced from that at which the battery 74A is discharged during vehicle operation.

While preferred embodiments of the invention have been disclosed in detail, it should be understood by those skilled art that various other modifications may be made to the illustrated embodiment without departing from the scope of the invention as described in the specification and defined in the appended claims.

I claim:

1. The combination comprising:

a vehicle including a load powered by a nickel hydroxide based battery;

generator means operable for recharging said battery;

switch means selectively movable between a first position electrically coupling said battery to said load for the operation thereof and a second position electrically coupling said battery to said generator means for recharging said battery; and temperature control means for maintaining the temperature of said battery at a first temperature in the range of approximately +10° C. to +50° C. when said battery is electrically coupled to said load, said temperature control means being operable for maintaining said battery at a second temperature substantially lower than the first temperature and being in the range of approximately +10° C. to −30° C. when said battery is electrically coupled to said generator means.

2. A combination as set forth in claim 1 wherein said load includes drive means for propelling said vehicle.

3. A combination as set forth in claim 1
first connection means selectively coupling said generator means to said battery for recharging said battery;

second connection means selectively coupling said temperature control means to said vehicle for controlling the temperature of said battery; and wherein said temperature control means includes:
conduit means enveloping said battery for receiving coolant;

refrigeration means for reducing the temperature of the coolant; and pump means for pumping the coolant from said refrigeration means through said conduit means.

4. A combination as set forth in claim 3 wherein said generator means, said refrigeration means and said pump means are external of said vehicle.

5. A combination as set forth in claim 3 including:

a first inlet pipe in fluid communication with said conduit means;

a first outlet pipe in fluid communication with said conduit means;

a second inlet pipe in fluid communication with said heat exchanger means;

a second outlet pipe in fluid communication with said heat exchanger means;

first joint means for releasably connecting said first and second inlet pipes; and second joint means for releasably connecting said first and second outlet pipes.

6. A combination as set forth in claim 5 wherein said pump means is in series with said second inlet pipe.

7. A method of operating a nickel hydroxide based battery system used for powering a vehicle including a load comprising the steps of:

(a) electrically coupling a nickel hydroxide based battery to the load for the operation thereof;

(b) electrically decoupling the battery from the load and coupling the battery to a generator means for recharging the battery;

(c) maintaining the temperature of the battery at a first temperature in the range of approximately 10° C. to 50° C. when the battery is electrically coupled to the load; and (d) maintaining the temperature of the battery at a second temperature substantially lower than the first temperature and being in the range of approximately 10° C. to −30° C. when the battery is electrically coupled to the generator means.

8. A combination as set forth in claim 1 wherein said battery is selected from the group consisting of nickel-hydrogen, nickel-metal hydroxide, nickel-iron, nickel-zinc, and nickel cadmium.

9. A combination as set forth in claim 3 wherein the coolant is selectively liquid or gas.

* * * * *